United States Patent Office 2,773,670
Patented Dec. 11, 1956

2,773,670

DRILLING FLUID COMPOSITION AND METHOD

George Miller, Arcadia, Calif., assignor to Oil Base, Inc., Compton, Calif., a corporation of California No Drawing. Application June 9, 1952, Serial No. 292,579

10 Claims. (Cl. 255—1.8)

This invention relates to the drilling of wells, and has particular reference to a composition and method for preventing or stopping the loss of drilling fluid from the well bore into the surrounding formation.

The rotary drilling of oil and gas wells requires the use of a drilling fluid or mud which consists of a suspension in a base of water or oil, or water and oil, of a material such as clays, calcium carbonate, etc. Additional weight materials such as crushed oyster shells, barytes, galena, etc., are sometimes used. These drilling fluids perform the functions of lubricating the drilling bit, carrying the cuttings up to the surface, furnishing a static head to overcome formation pressures, and form on the walls of the borehole a substantially impervious sheath to prevent the loss of the fluid into the formation.

Under ordinary formation conditions, drilling fluids having plastering or sheath-forming properties perform these functions adequately. However, formations are often encountered which have fissures, cavities or crevices, and in such areas, especially in low pressure, coarse-grained formations, the spaces between adjacent particles of formation material are too great to permit the necessary sheath to be formed even by fluids having optimum plastering properties. Accordingly, when such a zone is reached, the drilling fluid passes from the borehole into the formation and circulation of the fluid stops or is materially reduced. Aside from the loss of large volumes of expensive fluid, such loss of circulation may lead to the freezing of the drill string, the collapse of the walls of the borehole and other undesirable and costly consequences.

Accordingly, one of the principal objects of this invention is to provide a novel drilling fluid containing a material especially suitable for preventing or stopping the loss of fluid into the formation surrounding the well hole, and a process for drilling wells utilizing such a fluid.

Another object of this invention is to provide a material for the prevention or stoppage of lost circulation, which material is adapted for use in clay-water fluids, oil base fluids, or emulsion-type drilling fluids.

A further object of this invention is to provide a drilling fluid and a process for drilling wells with the same, the fluid including a material which dissolves slowly in crude oil and hydrocarbons generally. Materials of this type are thus adapted for use in the oil or gas zone of a well since they may be readily removed by proper circulation of oil to permit production from the completed well, yet are sufficiently slowly soluble to prevent premature removal thereof by the action of the crude oil or gas already present in the formation.

Another object of this invention is to provide a drilling fluid and a process for drilling wells with the same, the fluid including a material which when added to the fluid, either water or oil base, does not dissolve therein but is carried by the fluid to the lost circulation zone in particulate form whereupon the discrete particles attach themselves to the formation structure and, due to the temperature and pressure conditions existing in the well hole, are bonded together to form a tenacious plastic cake, effectively blocking off the areas of lost circulation.

Another object of this invention is to provide a lost circulation material which, in addition to the advantages stated above, is relatively inexpensive in cost and readily utilized in any conventional drilling fluid system.

Other objects and advantages of this invention it is believed will be readily apparent from the following detailed description of preferred embodiments thereof.

I have found that asphaltic materials and particularly either natural or air-blown asphalts having certain properties are extremely well suited for use as a material for the prevention or stoppage of loss of drilling fluid circulation. These materials are added in the form of discrete particles to the drilling fluid and are suspended as such in the fluid to be carried therewith down through the drill pipe, out through the drilling bit and thence up through the annulus between the pipe and the bore hole. Upon reaching the lost circulation zone, due in part at least to the elevated temperatures and pressures found in the well, the asphalt particles attach themselves to the formation and are fused or bonded together and to the formation structure into a composite mat or cake which forms an effective seal against the passage of mud fluid into the formation.

It has been found that asphalts having a penetration of 25° C. of from 0 to about 3 and a melting point of from about 250° F. to about 320° F. are most suitable, and when used in an oil base or crude oil drilling fluid a penetration of 0 and a melting point of from about 300° F. to about 315° F. is especially desirable. In this connection it should be noted that asphalts having higher penetrations and lower melting points tend to be more readily dissolved in an oil base fluid or in a crude oil fluid and the use of such asphalts in these fluids should generally be avoided since they are likely to be substantially completely dissolved in the fluid before reaching the lost circulation zone. In the case of water base or emulsion type fluids, the penetration and melting point of the asphalt is not as critical since the solvation problem is considerably reduced.

Another important consideration in selecting a proper asphalt material in accordance with this invention is the particle size of the material itself. For the penetration and melting point ranges described above, it has been found that a gradation in particle size from about 325 mesh to 4 mesh is most suitable, with a substantial amount being coarser than 32 mesh. It will be understood that there is a relationship between particle size on the one hand and penetration and melting point on the other hand, especially where the material is to be added to an oil base or crude oil drilling fluid. That is, with asphalts having a penetration above 0 and a relatively low melting point, the proportion of coarse to fine particles should be increased. Additionally, the particle size gradation depends to a certain extent upon the conditions present in the well itself.

As pointed out above, either air-blown or natural asphalts are contemplated within the scope of the invention. Natural asphalts, such as gilsonite, glance pitch, grahamite, natural lube asphalts, etc., and selected to have the properties described above, may be used. Air-blown asphalts are preferred, however, since by proper selection of stocks and by proper blowing technique (well known to the oil refiner) it is possible to produce uniform asphalts having the desired penetrations and melting points. Additionally, natural and air-blown asphalts may be blended to produce a material well adapted for use in connection with the invention.

The amount of lost circulation material to be added to the drilling fluid depends, of course, upon the conditions in the hole, including the depth of the hole and temperatures and pressures as well as the nature of the lost circulation zone itself. From about 1% to about 10% or more, by weight, of the asphalt should be added to the fluid.

The following examples are illustrative of preferred embodiments of this invention but it is not intended to limit the invention thereby. These examples represent actual uses of the compositions in the field.

*Example 1*

A well in the West Texas area was being deepened about 100 feet to another producing area. Drilling was begun using crude oil alone as a fluid and as much as 3,000 barrels of fluid were pumped into the production zone during one operation. To this system were added 36 barrels of oil base drilling fluid of the type disclosed in my United States Patent No. 2,316,968 and 600 pounds of air-blown asphalt having a penetration of 1 to 3 and a melting point of about 300° F. The particle size gradation of the added asphalt was from 325 mesh to 8 mesh with about 75% passing through a 32 mesh screen. After adding the asphalt, the loss of circulation was negligible, only about 30 barrels of fluid having been lost during the remainder of the operation. Within 45 minutes after pumping in the lost circulation material, loss of circulation was completely stopped.

*Example 2*

During completion of a well in West Texas using an oil base mud of the type referred to in Example 1, circulation of the mud ceased. To the mud were added 1500 pounds of an air-blown asphalt having a penetration of 0 and a melting point of about 300° F. This particular asphalt was a blend of one part material having a particle size gradation of 325 mesh to 8 mesh with about 75% passing through a 32 mesh screen and one part having a particle size gradation of 100 mesh to 4 mesh with about 15% passing through a 20 mesh screen. After addition of this asphalt material, there was no further indication of loss of mud.

*Example 3*

About 400 pounds of air-blown asphalt of the type referred to in Example 2 were added to the oil base drilling fluid in a well in Snyder, Texas. This was a deepening job where loss of the untreated oil base fluid to an old acidized zone was certain. No loss of circulation whatsoever was encountered after the addition of the asphalt additive.

*Example 4*

During the deepening of a well in Santa Fe Springs, California, circulation of the emulsion type drilling fluid (clay-water mud to which had been added a crude or semirefined oil and an emulsifying agent) diminished to the point where about 60 barrels an hour of fluid were being lost. To this fluid were added 1500 pounds of an air-blown asphalt having a penetration of 0 and a melting point of about 257° F. This asphalt was a blend of materials in the same proportions and having the same particle size gradations as that referred to in Example 3. After placement of this material, loss of circulation was reduced to one barrel of fluid or less per hour. After washing with crude to remove the asphalt cake formed on the formation wall, the well was producing about 500 barrels per day.

In preparing drilling fluids in accordance with this invention, as indicated, the asphalt lost circulation material may be added directly to the fluid at the well site, and this may be done by adding it either through the hopper or directly to the suction pit while circulating. Additionally, the fluid containing the lost circulation material may be premixed and trucked to the site.

While the asphalt material may be added to drilling fluids to prevent lost circulation from starting, in the case of clay-water muds and emulsion type fluids, it is preferred to wait until lost circulation has begun before addition of the asphalt in order to avoid recirculating an excessive number of relatively large masses of asphaltic material. In the case of oil base or crude oil drilling fluids, however, there is some solvation of the asphalt during the first cycle and hence the asphalt does not tend to agglomerate to the same extent as with the water base fluids.

It is not intended to limit this invention solely to drilling fluid compositions, at least in so far as the term "drilling fluid" may be narrowly construed to comprehend only fluids which are added to a well hole and circulated therein during the drilling operation, since compositions in accordance with this invention find utility in operations other than drilling. For example, compositions substantially similar to drilling fluids but incorporating a blocking agent have been pumped into a producing well for the purpose of blocking off one producing zone or a part of a producing zone so that another producing zone or another part of the same zone may be acidized without damage to the part blocked off. Such a process is known as "selective acidizing" and the fluid used to carry the blocking agent is commonly known to those skilled in the art as a "selective acidizing fluid." Asphaltic materials of the type disclosed herein have been added to otherwise conventional drilling fluids and the resulting fluids used successfully as selective acidizing fluids.

In the claims, it is to be understood that the term "oil base drilling fluid" is intended to include fluids consisting solely of crude oil as well as fluids in which crude or semirefined oils, together with additives, such as powdered asphalt, calcium oxide, soaps, Dresinates, sodium silicates, tall oil derivatives, fatty acids, etc., are utilized.

The above description and examples are intended to be illustrative only. Any modification of or variation therefrom which conforms to the spirit of the invention is intended to be included within the scope of the claims.

I claim:

1. A drilling fluid composition comprising an oil base drilling fluid having added thereto discrete particles of asphalt having a penetration at 25° C. of from 0 to about 3 and a melting point of from about 250° F. to about 320° F., said asphalt particles being slowly soluble in hydrocarbons and adapted to be bonded together to form a mudsheath when exposed to the temperature and pressure conditions existing in a well hole.

2. A drilling fluid composition comprising an oil base drilling fluid having added thereto discrete particles of asphalt having a penetration at 25° C. of 0 and a melting point of from about 300° F. to about 315° F. said asphalt particles being slowly soluble in hydrocarbons and adapted to be bonded together to form a mud sheath when exposed to the temperature and pressure conditions existing in a well hole.

3. A drilling fluid composition comprising an oil base drilling fluid having added thereto from about 1% to about 10% by weight of discrete particles of asphalt having a penetration at 25° C. of from 0 to about 3 and a melting point of from about 250° F. to about 320° F., said asphalt particles being slowly soluble in hydrocarbons and adapted to be bonded together to form a mud-sheath when exposed to the temperature and pressure conditions existing in a well hole.

4. A drilling fluid composition comprising an oil base drilling fluid having added thereto from about 1% to about 10% by weight of discrete particles of asphalt having a penetration at 25° C. of 0 and a melting point of from about 300° F. to about 315° F., said asphalt particles being slowly soluble in hydrocarbons and adapted to be bonded together to form a mud sheath when exposed to the temperature and pressure conditions existing in a well hole.

5. A drilling fluid composition comprising an oil base drilling fluid having added thereto discrete particles of asphalt, said particles being characterized by gradation in size ranging from about 325 mesh to about 4 mesh with a substantial number of said particles being coarser than 32 mesh, and said asphalt having a penetration at 25° C. of from 0 to about 3 and a melting point of from about 250° F. to about 320° F.

6. A drilling fluid composition comprising an oil base drilling fluid having added thereto from about 1% to about 10% by weight of discrete particles of air-blown asphalt having a penetration at 25° C. of 0 and a melting point of from about 300° F. to about 315° F., said particles being characterized by gradation in size ranging from about 325 mesh to about 4 mesh with a substantial number of said particles being coarser than 32 mesh.

7. In a process for drilling a well hole with well drilling tools wherein there is circulated in the well an oil base drilling fluid, the method of forming a cake on the wall of said well hole to decrease the loss of fluid into surrounding earthen formations which comprises admixing with said drilling fluid discrete particles of asphalt having a penetration at 25° C. of from 0 to about 3 and a melting point of from about 250° F. to about 320° F., said particles being characterized by a gradation in size and being slowly soluble in hydrocarbons, maintaining said asphalt in said fluid in particulate form as the fluid is passed into the well hole, and contacting said wall of said well hole with the resulting fluid under conditions of elevated temperature and pressure to bond said particles together and to said wall to form said cake thereon.

8. An oil base fluid for placement in a well hole, said fluid containing discrete particles of asphalt having a penetration at 25° C. of from 0 to about 3 and a melting point of from about 250° F. to about 320° F., said particles being characterized by gradation in size ranging from about 325 mesh to about 4 mesh with a substantial number of said particles being coarser than 32 mesh.

9. In a process for drilling a well hole with well drilling tools wherein there is circulated in the well an oil base drilling fluid, the method of forming a cake on the wall of said well hole to decrease the loss of fluid into surrounding earthen formations which comprises admixing with said drilling fluid discrete particles of asphalt having a penetration at 25° C. of 0 and a melting point of from about 300° F. to about 315° F., said particles being characterized by a gradation in size and being slowly soluble in hydrocarbons, maintaining said asphalt in said fluid in particulate form as the fluid is passed into the well hole, and contacting said wall of said well hole with the resulting fluid under conditions of elevated temperature and pressure to bond said particles together and to said wall to form said cake thereon.

10. An oil base fluid for placement in a well hole, said fluid containing discrete particles of asphalt having a penetration at 25° C. of 0 and a melting point of from about 300° F. to about 315° F., said particles being characterized by gradation in size ranging from about 325 mesh to about 4 mesh with a substantial number of said particles being coarser than 32 mesh.

References Cited in the file of this patent
UNITED STATES PATENTS

| | | |
|---|---|---|
| 1,307,027 | Swan | June 17, 1919 |
| 1,361,282 | Nolan | Dec. 7, 1920 |
| 2,033,509 | Bowie | Dec. 3, 1935 |
| 2,599,745 | Campbell | June 10, 1952 |
| 2,634,098 | Armentrout | Apr. 7, 1953 |

OTHER REFERENCES

Bowie-Hardening of Mud Sheaths in Contact with Oil, Bureau of Mines Report of Investigations No. 3354, pages 5, 6, and 7, November 1937.